United States Patent
Revilla et al.

(10) Patent No.: US 6,216,223 B1
(45) Date of Patent: Apr. 10, 2001

(54) METHODS AND APPARATUS TO DYNAMICALLY RECONFIGURE THE INSTRUCTION PIPELINE OF AN INDIRECT VERY LONG INSTRUCTION WORD SCALABLE PROCESSOR

(75) Inventors: Juan Guillermo Revilla; Edwin F. Barry, both of Cary; Patrick Rene Marchand, Apex; Gerald G. Pechanek, Cary, all of NC (US)

(73) Assignee: Billions of Operations Per Second, Inc., Chapel Hill, NC (US)

( * ) Notice: Subject to any disclaimer, the term of this patent is extended or adjusted under 35 U.S.C. 154(b) by 0 days.

(21) Appl. No.: 09/228,374

(22) Filed: Jan. 12, 1999

Related U.S. Application Data

(60) Provisional application No. 60/071,248, filed on Jan. 12, 1998.

(51) Int. Cl.[7] .................... G06F 9/22; G06F 9/318
(52) U.S. Cl. .................... 712/245; 712/22; 712/24
(58) Field of Search .................... 712/24, 213, 235, 712/23, 200, 229, 43, 245, 22; 708/209

(56) References Cited

U.S. PATENT DOCUMENTS

| | | | |
|---|---|---|---|
| 5,450,556 | * | 9/1995 | Slavenburg et al. .................... 712/235 |
| 5,485,629 | * | 1/1996 | Dulong .................... 712/24 |
| 5,590,368 | * | 12/1996 | Heeb et al. .................... 712/43 |
| 5,625,835 | * | 4/1997 | Ebcioglu et al. .................... 712/23 |
| 5,649,135 | * | 7/1997 | Pechanek et al. .................... 712/200 |
| 5,787,303 | * | 7/1998 | Ishikawa .................... 712/24 |
| 5,826,054 | * | 10/1998 | Jacobs et al. .................... 712/213 |
| 5,978,822 | * | 11/1999 | Muwafi et al. .................... 708/209 |
| 5,983,336 | * | 11/1999 | Sakhin et al. .................... 712/24 |
| 6,026,478 | * | 2/2000 | Dowling .................... 712/24 |
| 6,026,486 | * | 2/2000 | Kodama et al. .................... 712/229 |

\* cited by examiner

*Primary Examiner*—John A. Follansbee
*Assistant Examiner*—Jungwon Chang
(74) *Attorney, Agent, or Firm*—Priest & Goldstein, PLLC

(57) ABSTRACT

A ManArray processor pipeline design addresses an indirect VLIW memory access problem without increasing branch latency by providing a dynamically reconfigurable instruction pipeline for SIWs requiring a VLIW to be fetched. By introducing an additional cycle in the pipeline only when a VLIW fetch is required, the present invention solves the VLIW memory access problem. The pipeline stays in an expanded state, in general, until a branch type or load VLIW memory type operation is detected returning the pipeline to a compressed pipeline operation. By compressing the pipeline when a branch type operation is detected, the need for an additional cycle for the branch operation is avoided. Consequently, the shorter compressed pipeline provides more efficient performance for branch intensive control code as compared to a fixed pipeline with an expanded number of pipeline stages. In addition, the dynamic reconfigurable pipeline is scalable allowing each processing element (PE) in an array of PEs to expand and compress the pipeline in synchronism allowing iVLIW operations to execute independently in each PE. This is accomplished by having distributed pipelines in operation in parallel, one in each PE and in the controller sequence processor (SP).

29 Claims, 9 Drawing Sheets

FIG. 3A

| 3 1 | 2 9 | | 1 5 | 1 4 | | 0 0 |
|---|---|---|---|---|---|---|
| | 00 | COMPACTED INSTRUCTION EXECUTE 2ND POSITION | | | COMPACTED INSTRUCTION EXECUTE 1ST POSITION | |

FIG. 3B

| 3 1 | 2 9 | 2 8 | 2 7 | | 1 5 | 1 4 | 1 3 | 1 2 | | 0 0 |
|---|---|---|---|---|---|---|---|---|---|---|
| 00 | 0 | 0 | 0 | STORE | | 0 | 0 | 0 | STORE | |
| | 0 | 0 | 1 | LOAD | | 0 | 0 | 1 | LOAD | |
| | 0 | 1 | 0 | ALU | | 0 | 1 | 0 | ALU | |
| | 0 | 1 | 1 | MAU | | 0 | 1 | 1 | MAU | |
| 00 | 1 | 0 | 0 | DSU-1 Div/Ext/Perm& BitOps | | 1 | 0 | 0 | DSU-1 Div/Ext/Perm& BitOps | |
| | 1 | 0 | 1 | DSU-2 Shift/Rot & Extil/Extis | | 1 | 0 | 1 | DSU-2 Shift/Rot & Extil/Extis | |
| | 1 | 1 | 0 | CONTROL-1 | | 1 | 1 | 0 | CONTROL-1 | |
| | 1 | 1 | 1 | CONTROL-2 | | 1 | 1 | 1 | CONTROL-2 | |

FIG. 4

| | CYCLE 1 | 2 | 3 | 4 | 5 | 6 | 7 | 8 | 9 | 10 |
|---|---|---|---|---|---|---|---|---|---|---|
| F1 | XV | sub | bz | ldi | add | ldi | sti | - | - | - |
| F2 | - | XV | sub | bz | ldi | add | ldi | sti | - | - |
| D | - | - | vliw | sub | bz | ldi | add | ldi | sti | - |
| E | - | - | - | vliw | sub | bz | ldi | add | ldi | sti |

FIG. 5

PIPLINE EXPANDED HERE                        PIPLINE COMPRESSED HERE

| | CYCLE 1 | 2 | 3 | 4 | 5 | 6 | 7 | 8 | 9 |
|---|---|---|---|---|---|---|---|---|---|
| F1 | XV | sub | bz | ldi | add | ldi | sti | - | - |
| F2 | NOT USED | XV | sub | bz | ldi | add | not used | not used | not used |
| D | - | - | vliw | sub | bz | ldi | add | sti | - |
| E | - | - | - | vliw | sub | bz | ldi | add | sti |

| | CYCLE 1 | 2 | 3 | 4 | 5 | 6 | 7 | 8 | 9 | 10 |
|---|---|---|---|---|---|---|---|---|---|---|
| F1 | XV | sub | bz | ldi | idi | ldi | sti | - | - | - |
| F2 | - | XV | sub | bz | nop | nop | nop | sti | - | - |
| D | - | - | vliw | sub | bz | nop | nop | nop | sti | - |
| E | - | - | - | vliw | sub | bz | nop | nop | nop | sti |

| | PIPELINE EXPANDED HERE | | | | | PIPELINE COMPRESSED HERE | | | |
|---|---|---|---|---|---|---|---|---|---|
| | CYCLE 1 | 2 | 3 | 4 | 5 | 6 | 7 | 8 | CYCLE 9 |
| F1 | XV | sub | bz | ldi | idl | ldl | sti | - | - |
| F2 | - | XV | sub | bz | nop | nop | nop | not used | not used |
| D | - | - | vliw | sub | bz | nop | nop | sti | - |
| E | - | - | - | vliw | sub | bz | nop | nop | sti |

FIG. 8A

| PIPE CYCLE | EP 1 | EP 2 | EP 3 | EP 4 | EP 5 | EP 6 | NP 7 | NP 8 | NP 9 | 10 |
|---|---|---|---|---|---|---|---|---|---|---|
| F1 | XV | SV | BZ | - | - | - | B-trg | - | - | - |
| F2 | - | XV | SV | BZ | - | - | - | - | - | - |
| D | - | - | VLIW | nop | BZ | - | - | B-trg | - | - |
| X | - | - | - | VLIW | nop | BZ | nop | nop | B-trg | - |

FIG. 8B

| PIPE CYCLE | EP 1 | EP 2 | EP 3 | NP 4 | NP 5 | NP 6 | NP 7 | NP 8 | NP 9 | 10 |
|---|---|---|---|---|---|---|---|---|---|---|
| F1 | XV | SV | BZ | - | - | B-trg | - | - | | |
| F2 | - | XV | SV | - | - | - | - | - | | |
| D | - | - | VLIW | BZ | - | - | B-trg | - | | |
| X | - | - | - | VLIW | BZ | nop | nop | B-trg | | |

METHODS AND APPARATUS TO DYNAMICALLY RECONFIGURE THE INSTRUCTION PIPELINE OF AN INDIRECT VERY LONG INSTRUCTION WORD SCALABLE PROCESSOR

CROSS-REFERENCE TO RELATED APPLICATIONS

The present application claims the benefit of U.S. Provisional Application Ser. No. 60/071,248 filed Jan. 12, 1998, entitled "Methods and Apparatus to Dynamically Expand the Instruction Pipeline of a Very Long Instruction Word Processor".

FIELD OF THE INVENTION

The present invention relates generally to improvements in array processing, and more particularly to methods and apparatus for dynamically expanding and compressing the instruction pipeline of a very long instruction word (VLIW) processor.

BACKGROUND OF THE INVENTION

In an architecture, such as the manifold array (ManArray) processor architecture, very long instruction words (VLIWs) are created from multiple short instruction words (SIWs) and are stored in VLIW memory (VIM). A mechanism suitable for accessing these VLIWs, formed from SIWs 1–n, is depicted in FIG. 1A. First, a special kind of SIW, called an "execute-VLIW" (XV) instruction, is fetched from the SIW memory (SIM 10) on an SIW bus 23 and stored in instruction register (IR1) 12. When an XV instruction is encountered in the program, the VLIW indirectly addressed by the XV instruction is fetched from VIM 14 on a VLIW bus 29 and stored in VLIW instruction register (VIR) 16 to be executed in place of the XV instruction by sending the VLIW from VIR 31 to the instruction decode-and-execute units.

Although this mechanism appears simple in concept, implementing it in a pipelined processor with a short clock period is not a trivial matter. This is because in a pipelined processor an instruction execution is broken up into a sequence of cycles, also called phases or stages, each of which can be overlapped with the cycles of another instruction execution sequence in order to improve performance. For example, consider a reduced instruction set computer (RISC) type of processor that uses three basic pipeline cycles, namely, an instruction fetch cycle, a decode cycle, and an execute cycle which includes a write back to the register file. In this 3-stage pipelined processor, the execute cycle of one instruction may be overlapped with the decode cycle of the next instruction and the fetch cycle of the instruction following the instruction in decode. To maintain short cycle times, i.e. high clock rates, the logic operations done in each cycle must be minimized and any required memory accesses kept as short as possible. In addition, pipelined operations require the same timing for each cycle with the longest timing path for one of the pipeline cycles setting the cycle time for the processor. The implications of the serial two memory accesses required for the aforementioned indirect VLIW operation in FIG. 1A is that for a single cycle operation to include both memory accesses would require a lengthy cycle time not conducive for a high clock rate machine. As suggested by analysis of FIG. 1A wherein the VIM address Offset 25 is contained within the XV instruction, the VIM access cannot begin until the SIM access has been completed. At which point, the VIM address generation unit 18 can create the VIM address 27 to select the desired VLIW from VIM 14, by adding a stored base address with the XV VIM OffSet value. This constraint means that if the number of stages in a typical three-stage (fetch, decode, execute) instruction pipeline is to be maintained, both accesses would be required to be completed within a single clock cycle (i.e. the fetch cycle). However, due to the inherent delay associated with random memory accesses, even if the fastest semiconductor technologies available today are used, carrying this requirement to the actual implementation would restrict the maximum speed, and hence, the maximum performance, that could be attained by the architecture.

On the other hand, if an additional pipeline stage were to be permanently added such that the memory accesses are divided across two pipeline fetch stages (F1 and F2), an even more undesirable effect of increasing the number of cycles it takes to execute a branch would result.

SUMMARY OF THE INVENTION

The present invention addresses a dynamic reconfigurable pipeline and methods of its use which avoids both of the above described types of "delayed" and multi-cycle branch problems. Thus, this dynamic reconfigurable pipeline as discussed further below is highly advantageous.

A unique ManArray processor pipeline design in accordance with the present invention advantageously solves the indirect VLIW memory access problem without increasing branch latency by providing a dynamically reconfigurable instruction pipeline for SIWs requiring a VLIW to be fetched. By introducing an additional cycle in the pipeline only when a VLIW fetch is required, the present invention solves the VLIW memory access problem. The pipeline stays in an expanded state, in general, until a branch type or non-XV-VLIW type operation is detected returning the pipe to a compressed pipeline operation. By compressing the pipeline when a branch type operation is detected, the need for an additional cycle for the branch operation is avoided by the present invention. Consequently, the shorter compressed pipeline provides more efficient performance for branch intensive control code as compared to a fixed pipeline with an expanded number of stages.

In addition, the dynamic reconfigurable pipeline is scalable allowing each processing element (PE) in an array of PEs to expand and compress the pipeline in synchronism allowing independent iVLIW operations in each PE. This is accomplished by having distributed pipelines in operation in parallel, one in each PE and in the controller Sequence Processor (SP).

The present invention also allows the SIW memory and VLIW memory to have a full cycle for memory access time. This approach enables an indirect VLIW processor to achieve a higher frequency of operation because it minimizes the logic operations and number of memory access required per cycle. By using this approach, a more balanced pipeline design is obtained, resulting in a micro-architecture that is more suitable for manufacturing across a wide-range of process technologies.

These and other advantages of the present invention will be apparent from the drawings and Detailed Description which follow.

BRIEF DESCRIPTION OF THE DRAWINGS

FIG. 3A illustrates aspects of sequential execution order for a VLIW based compact instruction format suitable for use in conjunction with the present invention;

FIG. 3B illustrates exemplary instruction groupings for the compact instruction format of FIG. 3A;

FIG. 4 illustrates the execution of instructions in a 4-stage instruction pipeline with delayed branches;

FIG. 5 illustrates an exemplary execution of instructions in a dynamically reconfigurable instruction pipeline with delayed branches in accordance with the present invention;

FIG. 6 illustrates the execution of instructions in a 4-stage pipeline with multi-cycle branches;

FIG. 7 illustrates an exemplary execution of instructions in a dynamically reconfigurable instruction pipeline with multi-cycle branches in accordance with the present invention;

FIG. 8A illustrates operation of a reconfigurable pipeline with no compression after an SV operation;

FIG. 8B illustrates operation of a reconfigurable pipeline with compression after an SV operation in accordance with the present invention.

DETAILED DESCRIPTION

Further details of a presently preferred ManArray architecture for use in conjunction with the present invention are found in U.S. Pat. No. 6,023,753, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. Pat. No. 6,151,668 filed Nov. 6, 1998, U.S. patent application Ser. No. 09/205,558 filed Dec. 4, 1998 and entitled "Methods and Apparatus for Dynamic Very Long Instruction Word Sub-Instruction Selection for Execution Time Parallelism in an Indirect Very Long Instruction Word Processor", and U.S. Pat. No. 6,101,592, Provisional Application Ser. No. 60/068,021 entitled "Methods and Apparatus for Scalable Instruction Set Architecture" filed Dec. 18, 1997, Provisional Application Ser. No. 60/071,248 entitled "Methods and Apparatus to Dynamically Expand the Instruction Pipeline of a Very Long Instruction Word Processor" filed Jan. 12, 1998, Provisional Application Ser. No. 60/072,915 entitled "Methods and Apparatus to Support Conditional Execution in a VLIW-Based Array Processor with Subword Execution" filed Jan. 28, 1988, Provisional Application Ser. No. 60/077,766 entitled "Register File Indexing Methods and Apparatus for Providing Indirect Control of Register in a VLIW Processor" filed Mar. 12, 1998, Provisional Application Ser. No. 60/092,130 entitled "Methods and Apparatus for Instruction Addressing in Indirect VLIW Processors" filed Jul. 9, 1998, Provisional Application Ser. No. 60/103,712 entitled "Efficient Complex Multiplication and Fast Fourier Transform (FFT) Implementation on the ManArray" filed Oct. 9, 1998, Provisional Application Ser. No. 60/106,867 entitled "Methods and Apparatus for Improved Motion Estimation for Video Encoding" filed Nov. 3, 1998, Provisional Application Ser. No. 60/113,637 entitled "Methods and Apparatus for Providing Direct Memory Access (DMA) Engine" filed Dec. 23, 1998 and Provisional Application Ser. No. 60/113,555 entitled "Methods and Appratus Providing Transfer Control" filed Dec. 23, 1998, respectively, and incorporated by reference herein in their entirety.

Figure 1A:
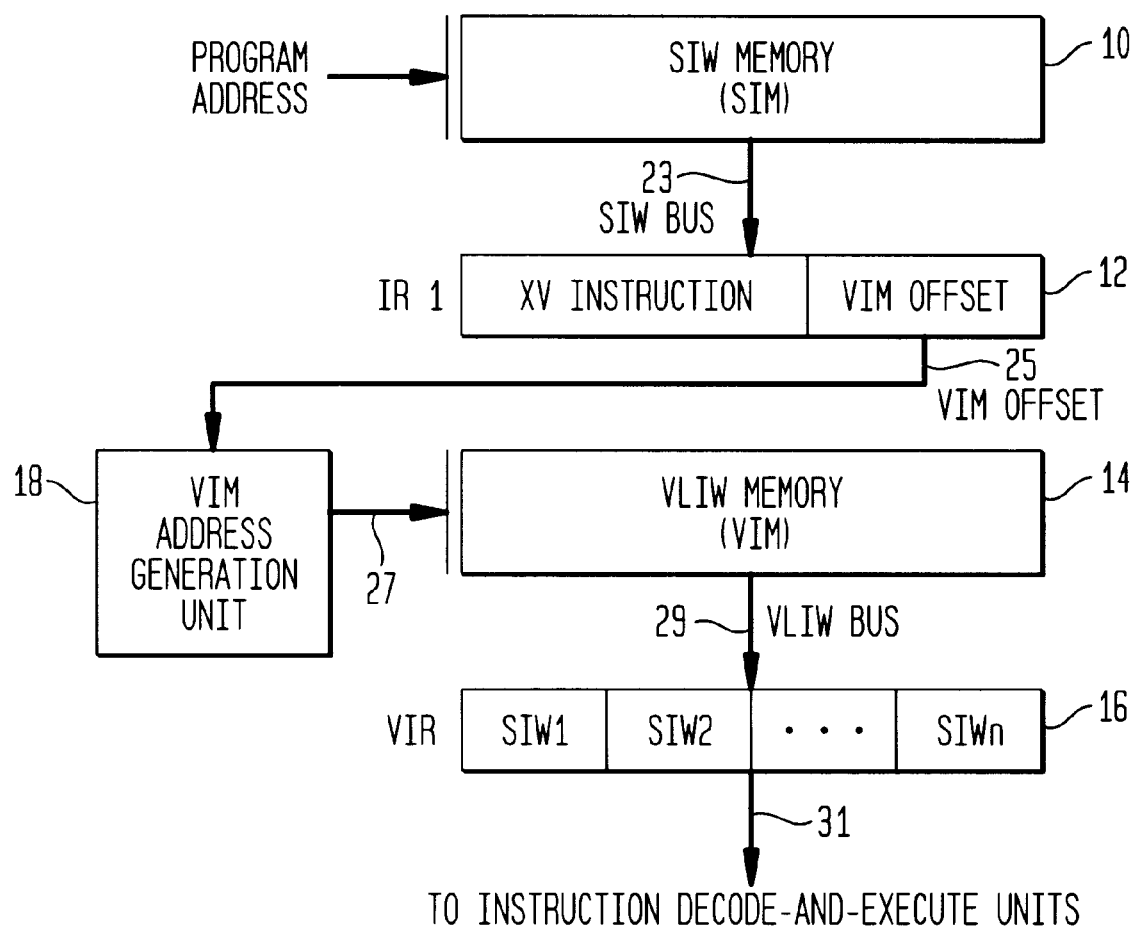
FIG. 1A shows a VLIW instruction fetch mechanism which illustrates potential processing delays or bottlenecks in the absence of the present invention.
Figure 1B:
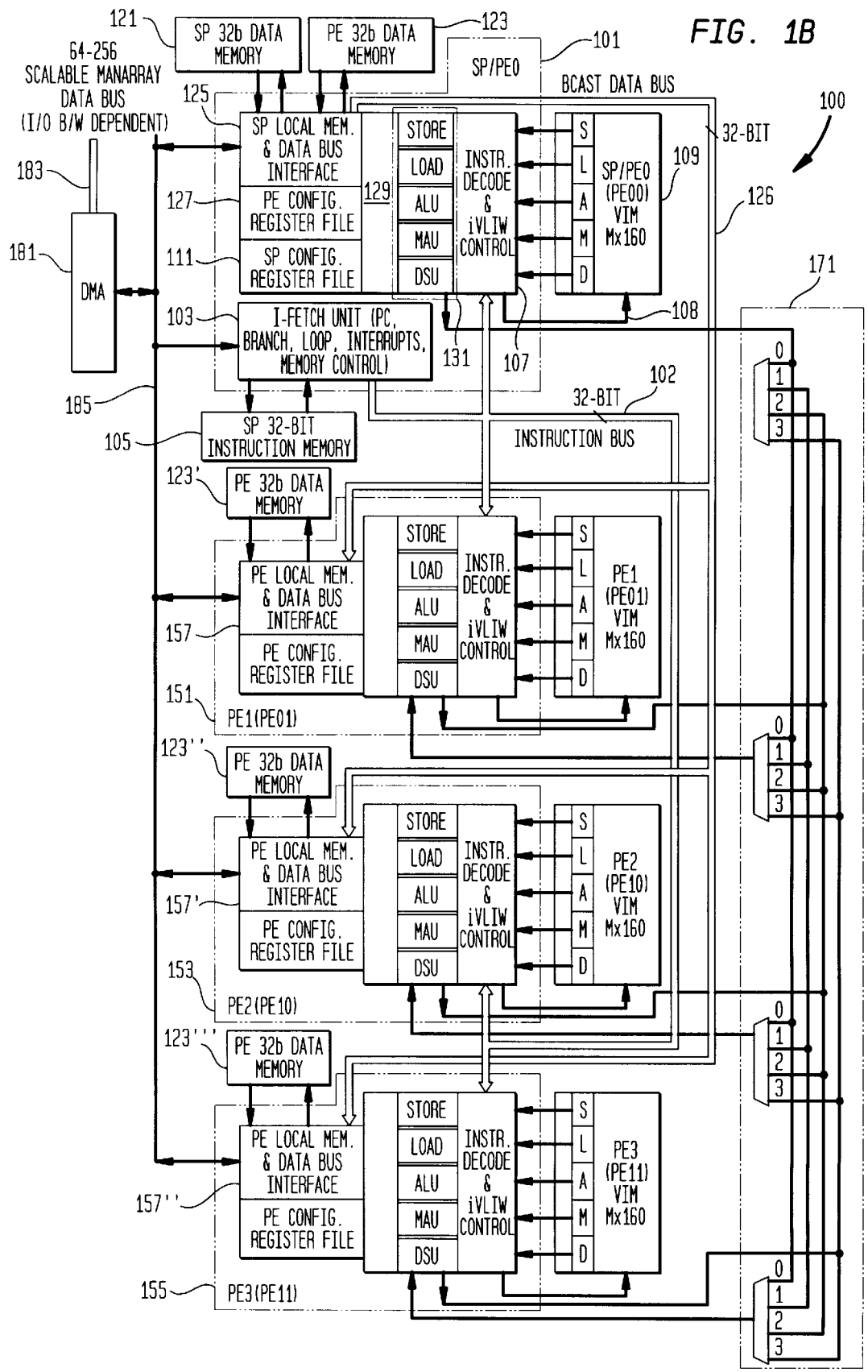
FIG. 1B illustrates a ManArray 2×2 iVLIW processor which can suitably be employed with this invention.

In a presently preferred embodiment of the present invention, a ManArray 2×2 iVLIW Single Instruction Multiple Data stream (SIMD) processor 100 shown in FIG. 1B contains a controller Sequence Processor (SP) combined with Processing Element-0 (PE0) SP/PE0 101, as described in further detail in U.S. Application Ser. No. 09/169,072 entitled "Methods and Apparatus for Dynamically Merging an Array Controller with an Array Processing Element". Three additional PEs 151, 153, and 155 are also utilized to demonstrate the dynamic reconfigurable pipeline methods and apparatus of the present invention. It is noted that the PEs can be also labeled with their matrix positions as shown in parentheses for PE0 (PE00) 101, PE1 (PE01)151, PE2 (PE10) 153, and PE3 (PE11) 155. The SP/PE0 101 contains a fetch controller 103 to allow the fetching of SIWs from a 32-bit instruction memory 105. The fetch controller 103 provides the typical functions needed in a programmable processor such as a program counter (PC), branch capability, digital signal processing loop operations, support for interrupts, and provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs can be optimized for a floating point application. For the purposes of this description, it is assumed that the execution units 131 are of the same type in the SP/PE0 and the other PEs. In a similar manner SP/PE0 and the other PEs use a five instruction slot iVLIW architecture which contains a VIM memory 109 and an instruction decode and VIM controller function unit 107 which receives instructions as dispatched from the SP/PE0's I-Fetch unit 103 and generates the VIM addresses-and-control signals 108 required to access the iVLIWs, identified by the letters SLAMD in 109, stored in the VIM. The loading of the iVLIWs is described in further detail in U.S. Pat. No. 6,151,688 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs, 151, 153, and 155 contain common physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is cluster switch 171 further described in U.S. Pat. No. 6,023,753, U.S. application Ser. No. 08/949,122 entitled "Methods and Apparatus for Manifold Array Processing", and U.S. Application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in a DMA control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via bus 185.

All of the above noted patents and patent applications are assigned to the assignee of the present invention and incorporated herein by reference in their entirety.

Turning to details of the ManArray processor dynamic reconfigurable instruction pipeline design of the present invention, this pipeline design advantageously solves the indirect VLIW memory access problem without increasing branch latency. Branches, also known as jumps (JMP), calls and return instructions are operations which change the sequential flow of the program code. Briefly, in a sequence of fetched instructions, if an instruction is an XV instruction, a pipeline control unit expands the instruction pipeline by adding one cycle to allow the retrieval of the requested VLIW from VIM at the address specified indirectly by the XV instruction and a stored VIM base address value. The fetched VLIW is sent to the execution units to perform the required operation in the following cycle.

If the pipeline has not been expanded and a received SIW is not an XV instruction then the instruction is passed directly to the decode-and-execution units to perform the required operation in the next stage. Note that because the pipeline was not expanded prior to receiving the instruction, no delay is incurred in passing the instruction to the decode-and-execution units.

Once a first XV instruction has been encountered and the pipeline has been expanded, instruction processing continues with SIW instructions being fetched from the short instruction word memory (SIM). A received SIW is decoded to determine if the instruction is a) not a branch or VLIW type of instruction, b) a branch type of instruction, or c) a VLIW-type (non-XV) instruction.

If the instruction is not a branch or VLIW type of instruction, the instruction is passed to the decode-and-execution unit to perform the required operation. Note that because the pipeline was expanded prior to receiving the instruction, the instruction now follows the expanded pipeline operation sequence. If the instruction is a branch or a VLIW-type (non-XV) of instruction, the pipeline is compressed.

Figure 2:
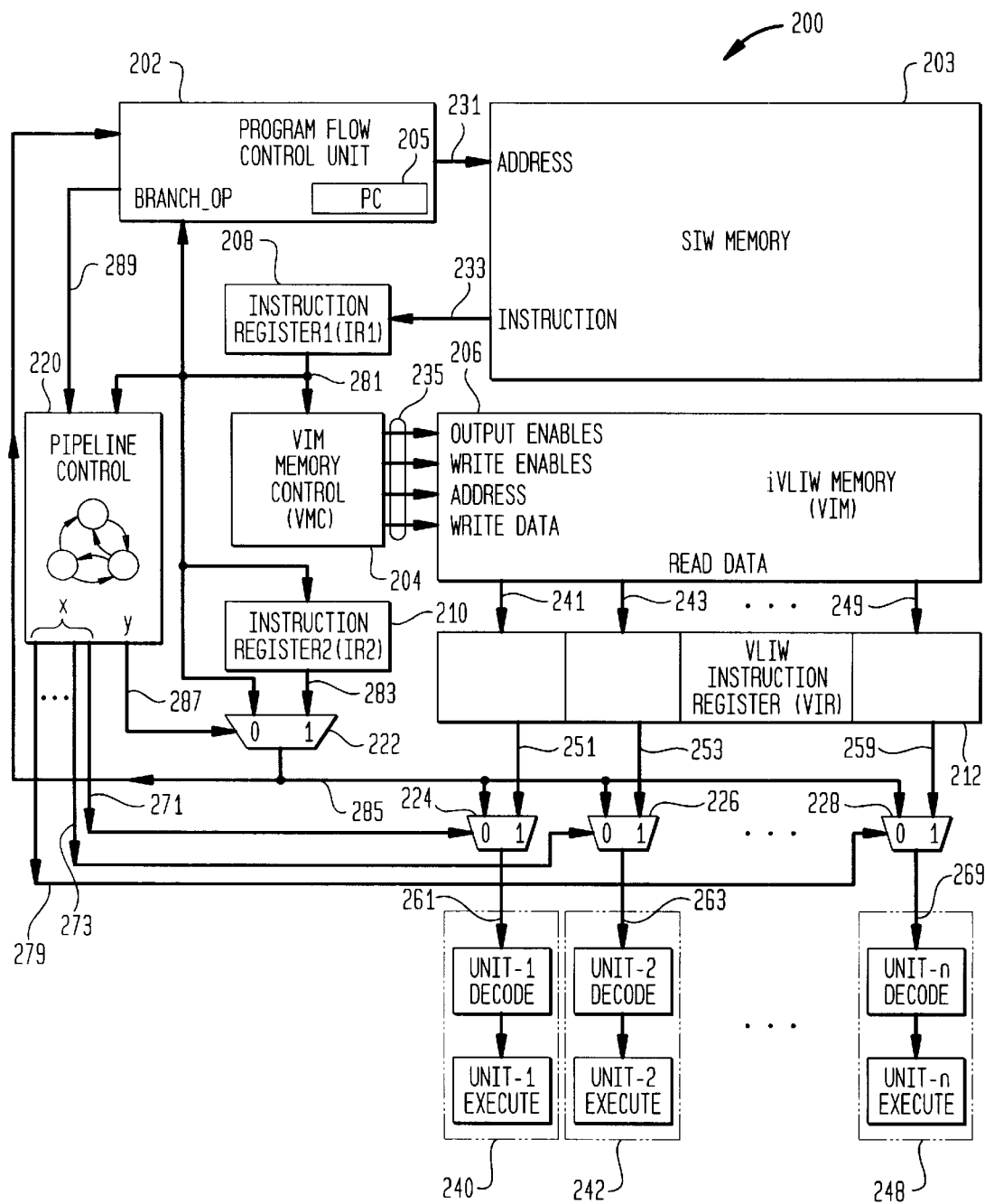
FIG. 2 illustrates a reconfigurable instruction sequencer in accordance with the present invention.

In a presently preferred embodiment, a reconfigurable instruction sequencer 200 in accordance with the present invention, as shown in FIG. 2, comprises a program flow control unit 202, containing program counter logic (PC) 205, for reading instructions from an SIW memory 203 (SIM), a VLIW memory controller (VMC) 204 for reading instructions from VLIW memory 206 (VIM), an instruction register 1 (IR1) 208, an instruction register 2 (IR2) 210, VLIW instruction register (VIR) 212, pipeline control 220, multiplexer 222, multiplexers 224, 226, . . . , 228, and a first decode-and-execute unit-1 240, a second decode-and-execute unit-2 242, and an nth decode-and-execute unit-n 248. Instruction processing begins with the program flow control unit 202 generating an SIW memory fetch address and control signal or signals 231 to read an instruction from SIM 203. The instruction register 1 208 receives the fetched SIW 233. The instruction in IR1 is decoded by the VLIW memory controller 204 and if necessary a VLIW memory access is performed. If a VLIW memory fetch instruction is decoded, the VMC 204 generates the appropriate address and control signals 235 to fetch a VLIW, consisting of up to n SIWs 241, 243, . . . , 249, from the VIM 206 and stores the fetched VLIW in the VLIW instruction register 212. The pipeline control 220 also decodes the IR1 to determine the pipeline's next state as discussed in conjunction with FIG. 3.

Figure 3:
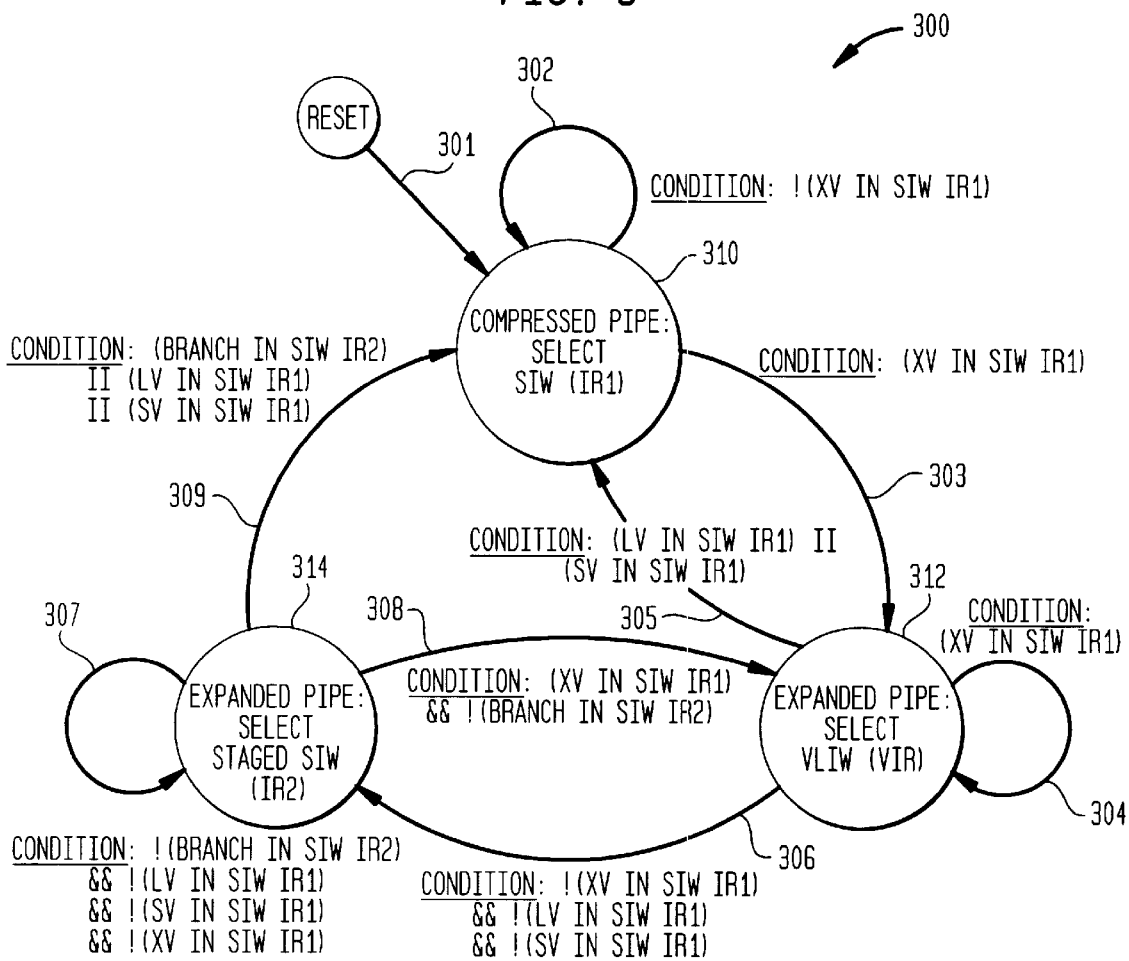
FIG. 3 illustrates a pipeline control state machine suitable for use in conjunction with the present invention.

FIG. 3 illustrates a pipeline control state machine 300 found in the pipeline control 220. The pipeline state control 220 controls the multiplexer 222 and multiplexers 224, 226, . . . , 228. Consequently, control signals "x" representing lines 271, 273, . . . , 279, and "y" representing line 287 are indicative of the pipeline state. In a simple case, the x multiplexer control lines 271, 273, . . . , 279 can be applied to a single control line common to the multiplexers 224, 226, . . . , 228. It is anticipated, however, that for signal noise reduction and reduced power usage, it is also possible to individually control the VLIW multiplexers based upon decode information contained in the SIW instruction. For clarity and simplicity of discussion though, it will be assumed that the x signals are treated as a single control line that controls each multiplexer 224, 226, . . . , 228. The multiplexers 222, 224, 226, . . . , 228 have a "0" and a "1" indication within the multiplexer. The "0,1" values indicate that when the control signal is a "0" the data path associated with the "0" in the multiplexer is enabled and when the control signal is a "1" the data path associated with the "1" in the multiplexer is enabled.

The pipeline control state machine 300 controls the general instruction sequencing and which instruction register (IR1 208, IR2 210, or VIR 212) contents are to be sent to the decode-and-execution units 261, 263 . . . 269 and 240, 242 . . . 248, respectively. The state machine 300 is designed to expand the pipeline to allow for the additional cycle required for the indirect VLIW memory fetches to occur. Once the pipeline is expanded it remains expanded until one of several instructions is decoded in which it is permissible to compress the pipeline. Compressing the pipeline is permissible when a branch type instruction is detected or when a write access to the VLIW memory is required.

The "Select SIW (IR1)" state 310 is the normal operating state the processor is in after a reset 301 has occurred, and it indicates that the pipeline is in a compressed state. In the compressed state, the instruction decode is using the register output (IR1) of the SIW memory. This means that in FIG. 2 {x=0,y=0} which enables the IR1 data path 281 to pass data through multiplexer 222 to output 285 and which is enabled to pass through multiplexers 224, 226, . . . , 228 to the decode-and-execution units 240, 242, . . . , 248. The decode portions 261, 263 . . . 269 of the decode-and-execution units determine if the instruction is to be executed in their respective unit or not. If the instruction is not to be executed, then a no operation (NOP) proceeds through the execution unit. If it is to be executed, then the normal instruction decoding and execution operation occurs as specified by the received instruction. With appropriate decoding and control logic, only the multiplexer associated with the desired decode-and-execute unit can be enabled for noise and power reduction purposes. With appropriate decoding and control logic and with time available in the processor cycle the multiplexers 224, 226, . . . , 228 can be placed prior to the VLIW instruction register. Variations are possible depending upon requirements for the processor.

The FIG. 3 select staged SIW (IR2) state 314, corresponding to FIG. 2 {x=0,y=1}, and select VLIW (VIR) state 312, corresponding to FIG. 2 {x=1,y=1}, indicate that the pipeline is in a expanded state. The select staged SIW (IR2) state is used to keep the pipeline expanded while executing non-VLIW and non-branch SIW instructions that follow the execution of instructions from the VLIW memory.

A transition from one state to the next is determined by decoding the IR1 and IR2 registers. The FIG. 3 components of the condition arcs "LV in SIW IR1", "SV in SIW IR1" 305 and "XV in SIW IR1" 303 and their logical NOT versions components of arcs 306, 307 and 302 are respectively decoded from the IR1 instruction register. The LV, SV, and XV instructions are SIW instructions that have an affect on the type of access made to the VLIW memory. An LV instruction loads the VLIW memory with instructions. An SV instruction, also known as SETV, is used to enable/disable slots of the VLIW by setting or clearing particular bits in the VLIW associated with each slot. An XV instruction fetches a VLIW from the VLIW memory to be decoded in the next cycle.

In FIG. 3, the condition: (XV in SIW IR1) 303 represents the hardware decoding of the instruction in IR1 to be an XV instruction. This XV in SIW IR1 condition then causes the pipeline to be expanded and the VLIW to be fetched from VIM. It is noted that the LV, SV, and XV instructions are qualified by a parameter to the VMC indicating whether this is an SP or PE instruction by decoding the SP/PE bit of IR1. This is desirable for scalability reasons to be discussed later.

If the pipeline control is in state 314 and an XV is received in IR1 and there is no branch in IR2, then condition 308 would be met and the pipeline transitions to state 312 where the VLIW for the XV is fetched. It is noted that the pipeline stays in state 312 with the repeated receiving of XVs in IR1 as indicated by transition arc 304. It is also noted that the pipeline stays in state 314 as long as there is not a branch in IR2, not an LV in IR1, not an SV in IR1 and not an XV in IR1, i.e., condition 307 is met.

It is noted in FIG. 3 that the expanded pipeline is compressed when branch type instructions and specific Load VLIW or Set VLIW instructions are detected. Reconfiguring the pipeline on these conditions reduces the latency overhead as compared to changing the pipeline between XV and non-XV instructions. In particular, the "Branch in SIW IR2" component of the condition for arc 309 of FIG. 3 is decoded by looking at bits in the IR2 instruction register. The branch condition can also be affected by the state of other system components. For example, in a ManArray indirect VLIW processor, interrupts force a branch to the interrupt vector table stored in the SIW memory. This type of branch operation can also cause the pipeline to compress so that there is less latency in executing the interrupt service routine. Whether interrupts cause the pipeline to compress may depend upon many factors, such as array size and application requirements. Another situation which can affect the pipeline is if the PFCU needs to arbitrate for access to the SIW memory. If the arbiter does not give immediate access to read the SIW memory, the pipe can also be compressed from an expanded pipe.

It is anticipated that with use of the ManArray dynamic compact instructions, further described in U.S. Pat. No. 6,101,592, the pipeline would enter the expanded state whenever a dynamic pluggable iVLIW-based compact instruction was received, except for some of the control-type compacted instructions. It is noted that iVLIW-based compact instructions are those that cause an indirect access of the VLIW memory as part of the compact-to-32 bit SIW translation process. An example of a VLIW-based compact instruction format and execute sequence order is shown in FIG. 3A. In FIG. 3B, the Store, Load, ALU, MAU, DSU-1, and DSU-2 instructions cause a VLIW memory read access as part of the translation from compact format to 32-bit format, as described in detail in the above patent application. The specific control type compacted instructions that would not cause a transition to an expanded state include, but are not limited to, branch and no-operation, NOP, type compacted instructions. These control types do not cause an access to the iVLIW memory and are contained in the Control-1 and 2 instruction types. It is noted that a compact XV instruction can be included in, for example Control-2 type instructions, in which case the compact XV instruction would expand the pipeline as previously described. To enter the expanded pipeline state, the pipeline state transition condition 303 in FIG. 3 would be modified with an OR of the detected compacted instruction condition. The transition condition 303 of FIG. 3 would then be of the form: Condition: (XV in SIW IR1)∥ (iVLIW-based Compacted Instruction in IR1). In general, any instruction that requires a read access to the VLIW memory would cause the pipeline to enter the expanded state. The exit from the expanded pipeline state would occur on the reception of any branch type operation that changes the sequential flow of the program code, including compact branch instructions.

While allowing the pipeline to be dynamically reconfigurable provides distinct advantages, there may be applications where it may be advantageous for a programmer to determine whether a fixed pipeline or a dynamic pipeline would be better suited to an application task. For example, having the ability to lock the pipeline provides easy determinism of instruction execution, when instruction and data memories have fixed access times. Also, in a multiple SP system, it may be of benefit to have a fixed pipeline mode of operation for easy synchronized communications between SPs. In addition, in support of future architecture developments and/or enhancements, being able to control the pipeline operational characteristics provides a mechanism to determine the performance difference between a fixed pipeline and a dynamic pipeline based upon types of applications.

To provide a programmer controlled locking mode, two new instructions and one status bit in the status control register (SCR) are provided to support locking and unlocking expanded pipeline (EP) mode. The compressed pipeline mode is also referenced as the normal pipeline (NP) mode. The two presently preferred instructions are:

| Instruction | Description |
| --- | --- |
| JMPLK <pc-rel address> | If executed when the pipeline is in EP mode, this instruction causes the pipeline to be held in EP mode until a JMPULK instruction is executed, at which point the pipeline is unlocked and reverts to NP operation. |
| JMPULK <pc-rel address> | If pipeline is in EP-locked state, then executing this instruction causes pipeline to revert to unlocked-NP state. If pipeline is not in EP-locked state, this instruction |

-continued

| Instruction | Description |
|---|---|
| | behaves the same way as any other PC-relative, unconditional JMP instruction. Executing this instruction guarantees that the pipeline is placed into the NP state. |

This approach allows the programmer to guarantee the state of the pipeline using one instruction, either JMPLK to force the pipeline to EP mode, or JMPULK to force the pipeline to NP mode.

A status bit (EPLK) in the SCR indicates the locked/unlocked state of the pipeline. If this bit is '1', then the pipe is in EP-locked state, otherwise it is in unlocked state (either NP or EP). The use of instructions to lock or unlock the pipeline eliminates mode bits. The status bit is made available for software programming to determine the state of the pipe.

The state transition table below describes how the state of the pipeline changes when different types of instructions are decoded. Initially, the pipeline is in NP mode. Any instruction which is not XV or JMPLK executes using 3 stages (not counting multiple execute stages for certain types of instructions). If an XV is encountered, the pipeline state is changed to EP state for the XV and subsequent instructions. If a JMPLK instruction is encountered, the pipeline enters EP-locked state. Subsequent instructions always follow the EP path. The following table shows state transitions for the pipeline for different instruction types.

State Transition Table:

Instruction Inputs and Next State

| Pipe State | Not (XV, JMPLK) | XV | JMPLK | JMPULK | Branch |
|---|---|---|---|---|---|
| NP | NP | EP | EP-L | NP | NP |
| EP | EP | EP | EP-L | NP | NP |
| EP-L | EP-L | EP-L | EP-L | NP | EP-L |

The following examples are presented to demonstrate that by reconfiguring the pipeline the expanded pipeline does not incur any cycle time penalty as compared to a fixed pipeline of expanded length with no reconfiguration. In the examples illustrated in FIGS. 4–8, F1 is a first fetch cycle, F2 is a second fetch cycle, D is the decode cycle, and an E is the execute cycle. Time in cycles proceeds from left to right as indicated by the row labeled |Cycle 1|2| . . . |10|410, 510, 610, 710, 810 and 820, respectively.

EXAMPLE 1

A "delayed" branch instruction sequence which allows instructions to execute in the shadow of the branch is discussed first. In this example, it is assumed the branch is taken. First, a 4-stage pipeline of fixed length is examined followed by a reconfigurable pipeline which expands to 4-stages and compresses to 3-stages as taught by this invention. With a 4-stage fixed pipeline, the additional pipeline stage results in the introduction of an additional "delay-slot" associated with the "delayed" branch. In the 4-stage instruction pipeline example of FIG. 4, a VLIW, an SIW, and a "delayed" branch are executed back-to-back as shown in the following pseudo-code example.

Pseudo-Code for FIG. 4

| | | |
|---|---|---|
| | xv 1 | ; execute VLIW |
| | sub r5, r10, r11 | ; execute SIW subtract |
| | bz next | ; branch to "next" if zero detected |
| | ldi r2, p7+ | ; execute load (1$^{st}$ delay slot instruction) |
| | add r4, r1, r2 | ; execute add (2$^{nd}$ delay slot instruction) |
| | ldi r3, p7+ | ; execute load (3$^{rd}$ delay slot instruction) |
| | ldi r4, p7+ | ; not executed |
| next: | sti r4, p8+ | ; branch target |

It is noted that in FIG. 4 three delay slot instructions are executed seemingly to take advantage of the additional cycle of latency the "delayed" branch incurs in a fixed 4-stage pipeline, but in practice it is not always possible to make use of the additional delay slots. Consequently, as compared to a 3-stage pipeline the 4-stage delayed branches will be less efficient to use.

With the dynamic reconfigurable pipeline in expanded state, the pipeline control unit 220 of FIG. 2 compresses the pipeline by removing the previously added stage (or cycle) as soon as the outcome of the branch is determined (i.e. whether the branch is taken or not). This mechanism is illustrated in the example shown in FIG. 5.

In the pseudo-code example for FIG. 5, a VLIW, an SIW, and a delayed branch are executed back-to-back.

Pseudo-Code for FIG. 5

| | | |
|---|---|---|
| | xv 1 | ; execute VLIW |
| | sub r5, r10, r11 | ; execute SIW subtract |
| | bz next | ; branch to "next" if zero detected |
| | ldi r2, p7+ | ; execute load (1$^{st}$ delay slot instruction) |
| | add r4, r1, r2 | ; execute add (2$^{nd}$ delay slot instruction) |
| | ldi r3, p7+ | ; not executed |
| next: | sti r4, p8+ | ; branch target. |

Referring to FIG. 5 for operation sequence and FIG. 2 for hardware operation, the reconfigurable pipeline is discussed in operation for the above pseudo-code sequence. First, the XV is fetched F1 from SIM 203 in Cycle-1 and is received in instruction register IR1 208 by the end of Cycle-1.

During Cycle-2, the SUB instruction is fetched, F1 cycle, from SIM 203 and is received in IR1 208 by the end of Cycle-2. In the beginning of Cycle-2, the IR1 instruction is decoded as an XV instruction. In response, the VLIW memory control 204 retrieves the requested VLIW from VIM 206, F2 cycle, and loads it into the VIR 212 by the end of Cycle-2, and the pipeline-control 220 extends the pipeline by inserting a new cycle (stage) to allow the VIM access.

During Cycle-3 the BZ instruction is fetched, F1 cycle, from SIM 203 and is received in IR1 208 by the end of Cycle-3. At the beginning of Cycle-3, the instruction in IR1 208, the subtract instruction, since the pipeline has been expanded, is passed to IR2 210 by the end of Cycle-3. For other reasons that affect the program operation, the instruction in IR1 is determined to not be a branch instruction. In Cycle-3, the fetched VLIW is in the decode D cycle in the decode-and-execution units.

During Cycle-4, the load ldi instruction is fetched, F1 cycle, from SIM 203 and is received in IR1 208 by the end of Cycle-4. At the beginning of Cycle-4, the instruction in IR1 208, the branch (bz) instruction, since the pipeline has been expanded, is passed to IR2 210 by the end of Cycle-4.

For other reasons that affect the program operation, the instruction in IR1 is determined to be a branch instruction which is used by the program flow control unit 202. In Cycle-4, the subtract (sub) instruction is in the decode D cycle in the decode-and execution unit and the VLIW is in the execute E cycle.

During Cycle-5, the add instruction is fetched, F1 cycle, from SIM 203 and is received in IR1 208 by the end of Cycle-5. At the beginning of Cycle-5, the instruction in IR1 208, the load ldi instruction, since the pipeline has been expanded, is passed to IR2 210 by the end of Cycle-5. For other reasons that affect the program operation the instruction in IR1 is determined to not be a branch instruction. At the beginning of Cycle-5, the branch instruction in IR2 210 is determined to be a delayed branch instruction and a Branch_op signal 289 is sent to the pipeline control unit. In response to the control signal, the pipeline control unit 220 compresses the pipeline by removing the expanded cycle (stage) at the beginning of Cycle 7 after the outcome of the branch has been determined in Cycle 6. The other instructions follow a similar sequence of events for the remaining cycles shown in FIG. 5. In Cycle 7, the pipeline is restored to its normal compressed state, after which the F2 stage is no longer used.

Because the pipeline is restored to its compressed state in the presence of a delayed branch with the present invention, the number of delay slots following the delayed branch instruction is kept at two. This compares favorably with the three delayed slots required with the fixed 4-stage pipeline of FIG. 4.

EXAMPLE 2

A multi-cycle branch instruction does not allow any instructions to execute in the "shadow" of the branch. It is assumed the branch is taken in the example. A 4-stage pipeline of fixed length is first examined, followed by a reconfigurable pipeline which expands to 4-stages and compresses to 3-stages as outlined by this invention. With a 4-stage fixed pipeline and a branch of the multi-cycle type, the addition of a pipeline cycle (stage) results in an increase in the number of cycles it takes to resume instruction execution after the branch has been resolved. This is illustrated in the example of FIG. 6. In FIG. 6, "nop" is used to indicate that no operation is being performed.

In the 4-stage instruction pipeline pseudo-code example for FIG. 6, a VLIW, an SIW, and a "multi-cycle" branch are executed back-to-back.

| Pseudo-Code for FIG. 6 | |
| --- | --- |
| xv 1 | ; execute VLIW |
| sub r5, r10, r11 | ; execute SIW subtract |
| bz next | ; branch to "next" if zero detected |
| ldi r2, p7+ | ; not executed |
| add r4, r1, r2 | ; not executed |
| ldi r3, p7+ | ; not executed |
| ldi r4, p7+ | ; not executed |
| next: sti r4, p8+ | ; branch target |

The main distinction between the multi-cycle branch operation and the "delayed" branch operation is that when a multi-cycle branch is detected in IR1, the program flow control unit 202 prevents further sequential addressing of the SIM. The last fetched instruction, in this case the load ldi instruction, is not allowed to progress through the pipeline. It is noted that 3-nop cycles, cycles 7, 8, and 9, are experienced, delaying the start of the code sequence at the branch target.

With the dynamic reconfigurable pipeline in expanded state, the pipeline control unit 220 compresses the pipeline by removing the previously added stage (or cycle) as soon as the outcome of the branch is determined (i.e. whether the branch is taken or not). This mechanism is illustrated in the example shown in FIG. 7. In the pseudo-code example below, a VLIW, an SIW, and a multi-cycle branch are executed back-to-back.

| Pseudo-Code for FIG. 7 | |
| --- | --- |
| xv 1 | ; execute VLIW |
| sub r5, r10, r11 | ; execute SIW subtract |
| bz next | ; branch to "next" if zero detected |
| ldi r2, p7+ | ; not executed |
| add r4, r1, r2 | ; not executed |
| ldi r3, p7+ | ; not executed |
| next: sti r4, p8+ | ; branch target. |

The following discussion addresses several important aspects illustrated in FIG. 7. At the beginning of Cycle-5, the branch instruction in IR2 210 is determined to be a multi-cycle branch instruction and a Branch_op signal 289 is sent to the pipeline control unit. In response to the control signal, the pipeline control unit 220 compresses the pipeline by removing the expanded cycle (stage) at the beginning of Cycle 7 after the outcome of the branch has been determined in Cycle 6. The other instructions follow a similar sequence of events for the remaining cycles shown in FIG. 7. In Cycle 7, the pipeline is restored to its normal compressed state, after which the F2 stage is no longer used.

Because the pipeline is restored to its compressed state in the presence of a multi-cycle branch with the present invention, the number of cycles it takes for instruction execution to resume after the multi-cycle branch instruction is kept at two, FIG. 7 cycles 7 and 8. This operation compares favorably with the three nop slots required with the fixed 4-stage pipeline of FIG. 6.

EXAMPLE 3

FIGS. 8A and 8B illustrate why it is advantageous to compress the pipeline for an SV or LV instruction. By compressing during a SV instruction the number of cycles it takes to fetch the branch target (B-trg) is reduced by one. This is seen by comparing cycles 4, 5, and 6 of FIG. 8A with those for FIG. 8B. FIGS. 8A and 8B depict XV, SV, BZ and branch target (B-trg) instruction pipeline sequences to highlight the differences between the two. In FIG. 8A with no compression after an SV, a nop cycle, cycle-5, is required between the execution of the VLIW and the bz instruction. In FIG. 8B, with compression after an SV, no nop cycle is needed and the bz instruction is executed directly after the VLIW. It is noted that no cycles are lost if the branch (bz) had been an XV instruction. In FIGS. 8A and 8B, EP stands for expanded pipeline and NP for normal (compressed) pipeline. A transition from EP to NP indicates that the pipeline has been compressed. The dashes represent instructions not pertinent to this disclosure.

Scalable Reconfigurable Pipeline

Figure 9:
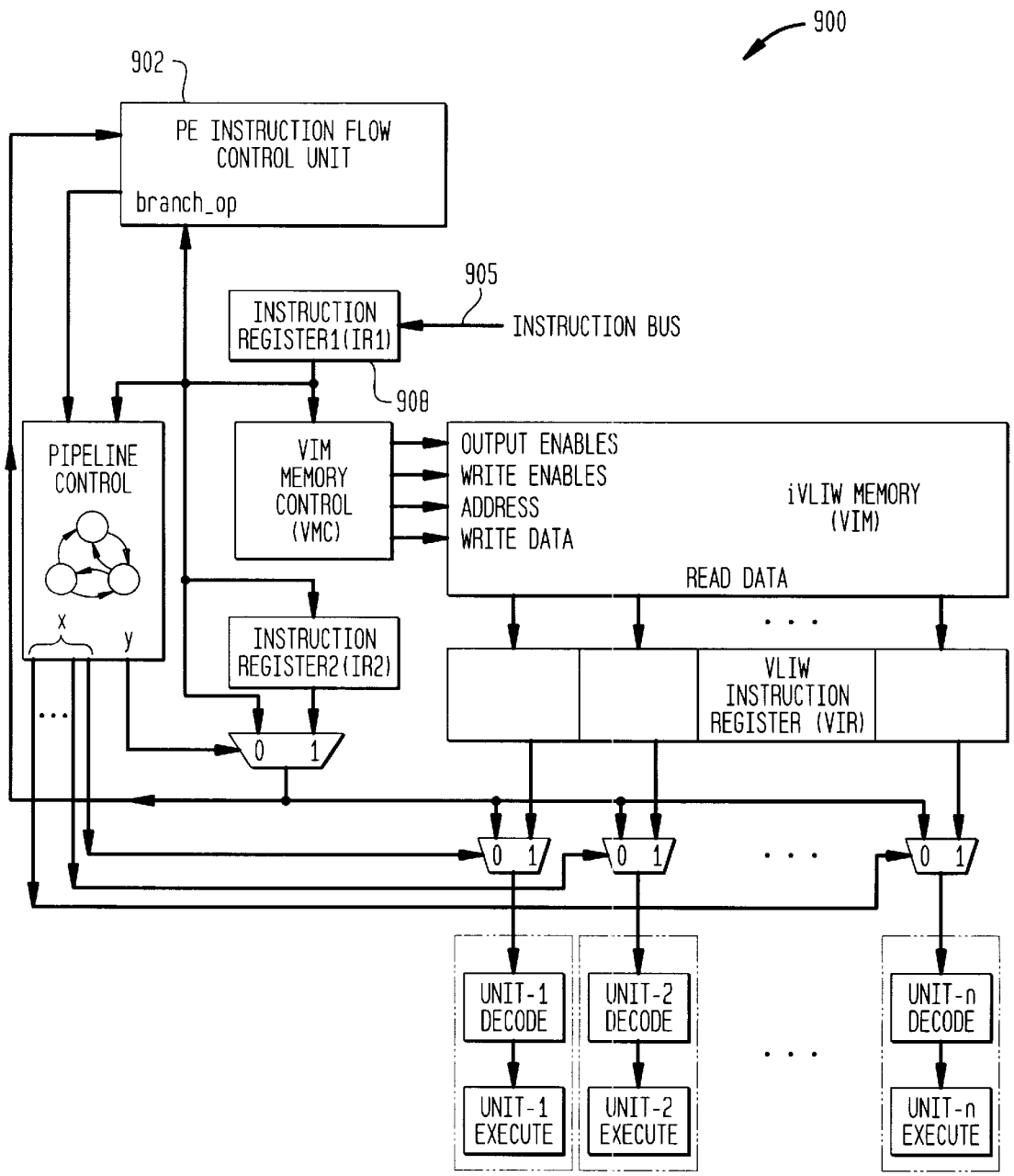
FIG. 9 illustrates PE instruction pipeline control for a distributed pipeline SIMD array in accordance with the present invention.

As addressed above, the present invention is advantageously applicable to a single-instruction-multiple-data (SIMD) processor comprising at least one processing element (PE), each having its own VIM, and a controller sequence processor (SP), where the PEs are configured to operate as a scalable array of processors controlled by the SP, for example the ManArray processor 100 of FIG. 1B. In such a processor, the SIWs are fetched and distributed to the PEs by the controller SP, and are decoded and executed by both. The dynamic reconfigurable instruction pipeline is extendible for parallel array processing by providing distributed pipelines where each PE contains its own pipeline control and a subset of the program flow control unit. Such a PE pipeline 900 is depicted in FIG. 9 which operates in the same manner as the pipeline of FIG. 2 except that there is no SIW fetching control since no SIM memory exists in the PEs. The PE instruction flow control unit 902 provides similar functions to the program flow control unit (PFCU) 202 in FIG. 2 with the removal of the program counter PC, SIW memory fetch control function, and other SP-only controller functions such as support for interrupts. The state machine 300 of FIG. 3 applies equally well for the PE pipeline control and retains the same functions in the PEs of this latter embodiment. All conditions associated with the transition arcs between states in FIG. 3 are determined locally in each PE, though the SP may forward specific information necessary to accomplish this end. For example, compressing the pipeline after interrupts, if necessary, would require a signal from the SP, dispatched to all PEs, to cause the pipelines to compress. It is possible to reconfigure the pipeline in an array processor since all instructions fetched by the SP instruction sequencer are dispatched to all PEs in the array in synchronous fashion. This is shown in FIG. 1B with instruction bus 102 going to each PE in the exemplary 2×2 system shown.

In FIG. 9, the instruction bus 905 is received into each PE's IR1 908. In the ManArray architecture, a specific bit in the instruction format, is used to differentiate between SP and PE instructions. It is noted that decoding of special opcodes to determine the SP/PE distinction is not precluded. The pipeline is distributed, with pipeline control local in each PE, in order to minimize the timing paths dependent upon pipeline state machine controls, such as the {x,y} signals discussed in FIG. 2. It is anticipated that other mechanisms can be made available to control the pipelines in each PE. For example, for low power and lower processor clock rates or with small array configurations, the pipeline control can be centralized rather than distributed.

While the present invention has been described in a variety of presently preferred embodiments, it will be recognized that a number of variations will be readily apparent and that the present teachings may be widely applied.

We claim:

1. An apparatus for dynamically expanding an instruction pipeline with a second fetch cycle for a VLIW memory access when required for indirect accessing of very long word instruction words (VLIWs) in a VLIW processor comprising:

a plurality of instruction decode units;

a plurality of execute units;

a first random access memory for storing short instruction words (SIWs);

a program flow control unit to control fetching of SIWs from the first random access memory;

a first instruction register for storing one or more of the SIWs fetched from the first random access memory;

a second random access memory for storing VLIWs used in operations involving execution of two or more of said plurality of execute units in parallel;

a VLIW memory control unit for reading VLIWs from the second random access memory;

a second instruction register for storing the one or more of the SIWs in an expanded pipeline mode of operation;

a VLIW instruction register for storing one or more VLIWs fetched from the second random access memory; and a pipeline control unit that decodes the one or more SIWs in the first instruction register and controls data flow paths to the decode units and the execute units for the purposes of reconfiguring the instruction pipeline in an expanded or a compressed mode of operation.

2. The apparatus of claim 1 wherein the program flow control unit further comprises a program counter and an SIW memory fetch mechanism which are operable to begin instruction processing by fetching one or more SIWs from the first random access memory.

3. The apparatus of claim 2 wherein the pipeline control unit further comprises a first instruction decoding circuit that receives a first one of said one or more fetched SIWs from the first instruction register and produces a control signal to control a fetch from the second random access memory if said first one of said one or more fetched SIWs is a VLIW.

4. The apparatus of claim 1 wherein the VLIW memory control unit further comprises a VLIW memory fetch mechanism which is operable to fetch VLIWs from the second random access memory.

5. The apparatus of claim 3 wherein the pipeline control unit is operable to expand the pipeline to allow sufficient time for a second memory fetch based upon said control signal.

6. The apparatus of claim 5 wherein the instruction pipeline in an expanded state further involves a second instruction decoding circuit to produce the control signals necessary to control the data flow paths to the decode units and the execute units for fetched SIWs.

7. The apparatus of claim 5 wherein the instruction pipeline in an expanded state further involves a second instruction decoding circuit to produce the control signals necessary to control the data flow paths to the decode and the execute units for fetched VLIWs.

8. The apparatus of claim 3 wherein the pipeline control unit decodes a received SIW and produces a control signal indicating if the SIW is a branch type instruction.

9. The apparatus of claim 3 wherein the pipeline control unit decodes a received SIW and produces a control signal indicating if the SIW is an LV or an SV instruction.

10. The apparatus of claim 5 wherein the pipeline control unit further comprises a second instruction decoding circuit to produce the control signals indicating a branch instruction is in the second instruction register so that it is necessary to compress the instruction pipeline to eliminate the need for an additional fetch cycle following the execution of the branch instruction.

11. The apparatus of claim 1 wherein the pipeline control unit can be locked in an expanded state or allowed to dynamically expand or compress the pipeline by use of:

a first special branch type instruction which locks the pipeline in a expanded state; and a second special branch type instruction which compresses the pipeline and allow dynamic reconfiguration to operate.

12. The apparatus of claim 11 further comprising a status bit which indicates the locked or unlocked state of the pipeline.

13. The apparatus of claim 1 wherein an indirect VLIW type of compact instruction causes the pipeline to enter an expanded pipeline state.

14. The apparatus of claim 13 wherein a first instruction decoding circuit receives a fetched SIW containing compact instructions and produces a control signal indicating a fetch from the second random access memory is required.

15. The apparatus of claim 14 wherein the pipeline control unit is operable to expand the pipeline to allow sufficient time for a special memory fetch based upon said control signal.

16. The apparatus of claim 14 wherein the first instruction decoding circuit decodes a compact branch type instruction producing the control signals necessary to compress the pipeline.

17. A single instruction multiple data (SIMD) indirect very long instruction word (iVLIW) array processor comprising a sequencer control unit with a reconfigurable instruction sequencer and distributed processing element (PE) reconfigurable pipeline controllers allowing each PE to expand and compress the pipeline locally within each PE.

18. A method for dynamically expanding an instruction pipeline with a second fetch cycle for a VLIW memory access when required for indirect accessing of a very long word instruction words (VLIWs) in a VLIW processor having a plurality of instruction units, first and second decoding circuits, and an instruction processing control unit, the method comprising the steps of:

storing short instruction words (SIWs) used in serial operations with a single execution unit in a first random access memory;

storing VLIWs used in operations involving execution of two or more execution units in parallel in a second random access memory;

reading SIWs from the first random access memory utilizing a first instruction fetch mechanism;

utilizing a simple decode mechanism to determine if a VLIW access and expanded pipeline is required;

expanding the pipeline; and reading VLIWs from the second random access memory utilizing a second instruction fetch mechanism.

19. The method of claim 18 further comprising the step of:

beginning instruction processing with the first instruction fetch mechanism reading an SIW from the first random access memory as controlled by the instruction processing control unit.

20. The method of claim 19 further comprising the steps of:

receiving a fetched SIW in a first instruction decoding circuit; and producing a control signal indicating if a fetch from the second random access memory is required.

21. The apparatus of claim 20 further comprising the step of:

utilizing the instruction processing control unit and the second decoding circuit to produce the control signals necessary to control the plurality of execution units for serial operation.

22. The method of claim 20 further comprising the step of:

utilizing the instruction processing control unit to control operation of the second decoding circuit on a delayed basis thereby effectively expanding the pipeline to allow sufficient time for a second fetch for purposes of fetching a VLIW from the second random access memory.

23. The method of claim 22 wherein subsequent to the VLIW having been successfully fetched, the method further comprises the step of:

receiving and processing the VLIW by the second decoding circuit to produce the control signals necessary to control the plurality of execution units for parallel operation.

24. The method of claim 19 further comprising the steps of:

receiving the fetched SIW in the first instruction decoding circuit; and producing a control signal indicating if a branch in the program is required.

25. The method of claim 24 further comprising the step of:

utilizing the instruction processing control unit to involve the second decoding circuit on a non-delayed basis thereby effectively compressing the pipeline to eliminate the need for an additional delay slot following the execution of the branch.

26. The method of claim 18 further comprising the steps of:

determining that the pipeline has not been expanded and a received SIW is not an XV instruction; and passing the received SIW directly to a decode and execution unit.

27. The method of claim 26 further comprising the step of performing the operation required by the SIW in the next stage.

28. The method of claim 18 further comprising the steps of:

determining that a received SIW requires a read access to the VLIW memory; and expanding the pipeline based upon said determination.

29. The method of claim 28 further comprising the step of:

exiting the expanded pipeline state on receiving any branch type operation that changes sequential flow of program code.

\* \* \* \* \*